US005481666A

United States Patent [19]
Nguyen et al.

[11] Patent Number: 5,481,666
[45] Date of Patent: Jan. 2, 1996

[54] OBJECT-ORIENTED NAVIGATION SYSTEM

[75] Inventors: Frank T. Nguyen, Campbell; David R. Anderson, Cupertino; Timothy J. O. Catlin, Belmont, all of Calif.

[73] Assignee: Taligent, Inc., Cupertino, Calif.

[21] Appl. No.: 112,821

[22] Filed: Aug. 25, 1993

[51] Int. Cl.⁶ .................................................. G06F 15/00
[52] U.S. Cl. ........................................................ 395/159
[58] Field of Search .................................. 395/145, 155, 395/161, 159, 160; 345/113, 119, 120

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,051,898 | 9/1991 | Wright et al. | 364/200 |
| 5,060,276 | 10/1991 | Morris et al. | 382/8 |
| 5,075,848 | 12/1992 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,371,844 | 12/1994 | Andrew et al. | 395/155 |

OTHER PUBLICATIONS

Byte, V.16(2), Feb. 1991, St. Peterborough US, pp. 211–221, Carr "The Point of the Pen".
PC Magazine, V.6(18), Oct. 1987, New York, US, pp. 141–152, Puglia, "Analyzing Data From All The Angles".
IBM Technical Disclosure Bulletin, V.35(4A) Sep. 1992, New York, US, pp. 85–86 "Input Technique to Support Both Text and Object Input".
"Reflex Plus: The Database Manager"—User's Guide, 1987, pp. 45–89.

Primary Examiner—Phu K. Nguyen
Attorney, Agent, or Firm—Keith Stephens

[57] ABSTRACT

A technique for navigating between a first and second object in an object-oriented computer system, including a processor with an attached storage and a display uses reference objects to insert references from one object into another. A first document is loaded into the storage and presented on the display. Then, a selection object is created and associated with a selected part of the first document on the display. A reference object is then created and associated with the first selection object in the storage. Then, a second document is loaded into the storage and presented on the display and the reference object is inserted into in the second document. Finally, navigation is enabled via the reference in the second document to the first selection in the first document. Commands can also be performed via a reference on a remote object as if the object resided locally.

40 Claims, 7 Drawing Sheets

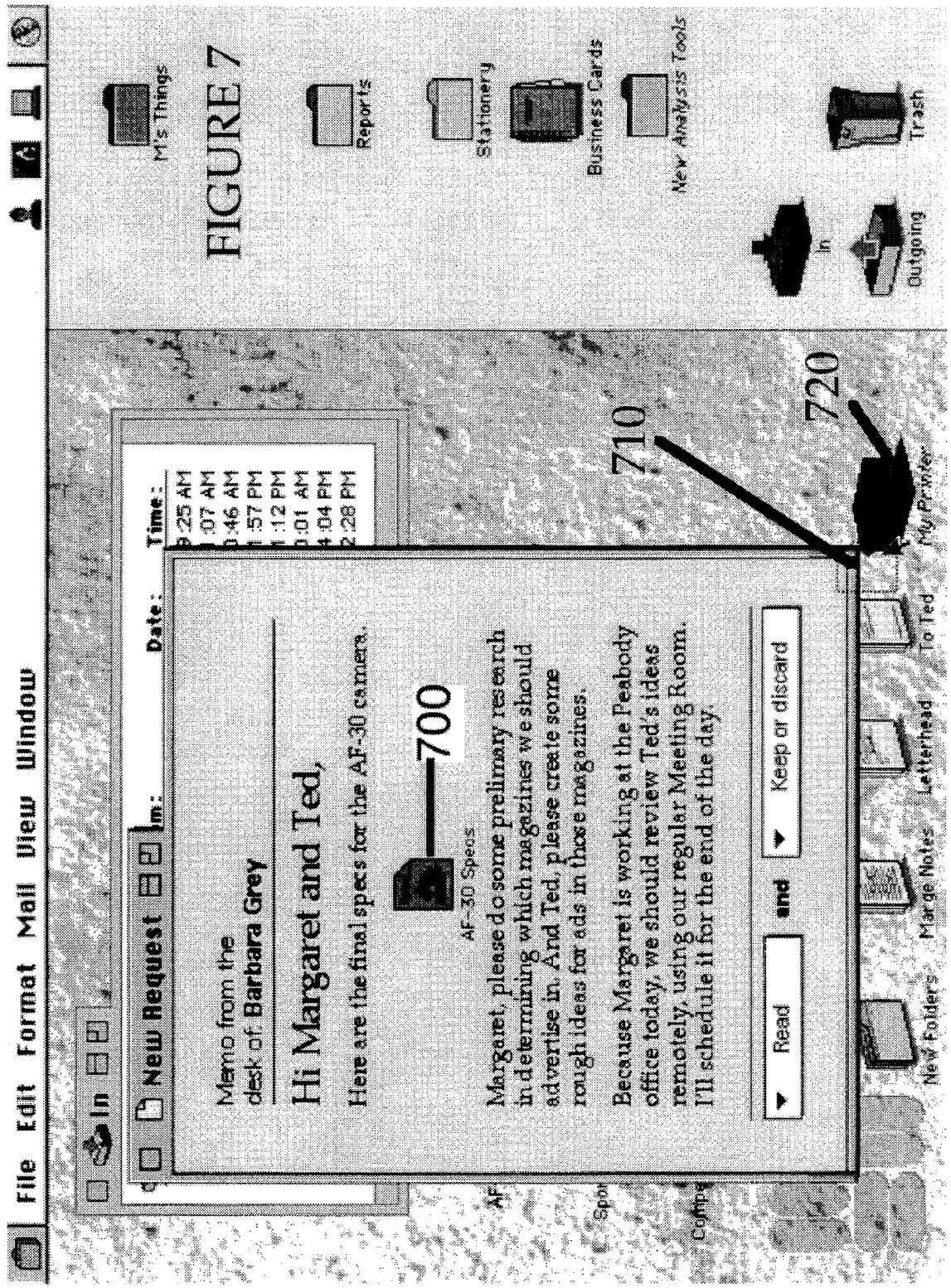

OBJECT-ORIENTED NAVIGATION SYSTEM

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED PATENT APPLICATIONS

This patent application is related to the patent application entitled Object Oriented Framework System, by Debra L. Orton, David B. Goldsmith, Christopher P. Moeller, and Andrew G. Heninger, filed Dec. 23, 1992, and assigned to Taligent, the disclosure of which is hereby incorporated by reference;

This patent application is related to the patent application entitled Dynamic Linking System, by Arn Schaeffer, David Anderson, Jack Palevich and Larry Rosenstein, filed Jul. 19, 1993, and assigned to Taligent, the disclosure of which is hereby incorporated by reference; and This patent application is related to the patent application entitled Container Object System, by Frank Nguyen, filed Jun. 3, 1993, and assigned to Taligent, the disclosure of which is hereby incorporated by reference.

FIELD OF INVENTION

This invention generally relates to improvements in computer systems and more particularly to a system and method for navigating between areas of information and the system as a whole and also to use of remote objects as if they were located locally.

BACKGROUND OF THE INVENTION

Computer systems often require linkages between applications such as those found in process control systems used to control oil refineries. So, for example, an operator at a graphical workstation could select a graphic symbol indicative of a valve, and change its status from closed to open to affect a change to its image on the display and a corresponding change to the process environment where the valve is closed. However, most process control systems were "hard-coded" to perform specific tasks. The linkages were not easily redefined via an operator's console. Further, the linkages were not flexible or multi-purpose. Rather each linkage had a predefined task that could not be readily changed.

More recently, Apple and other interactive computer systems have provided linkages between closed documents and containers or folders. So, for example, a user of an interactive computer system could select a graphical symbol indicative of a document and open the document via the graphical symbol. A folder could have a selected document dropped into it via the graphical symbol indicative of the folder.

SUMMARY OF THE INVENTION

The subject invention overcomes the deficiencies of the prior art by providing a system and method for navigating between objects in a computer system and using remote objects in a computer system as if they resided locally. A technique is disclosed for navigating in an object-oriented computer system, including a processor with an attached storage and a display. A first document is loaded into the storage and presented on the display. Then, a selection object is created and associated with the first document on the display. A reference is associated with the first selection in the storage. Then, a second document is loaded into the storage and presented on the display and a reference is associated with the first selection in the second document. Finally, navigation is enabled via the reference in the second document to the first selection in the first document.

BRIEF DESCRIPTION OF THE DRAWINGS

FIG. 7 illustrates an object in proximity to a reference object in partial completion of an action in accordance with a preferred embodiment.

DETAILED DESCRIPTION OF THE PREFERRED EMBODIMENT OF THE INVENTION

Overview of Navigation Links

Figure 1:
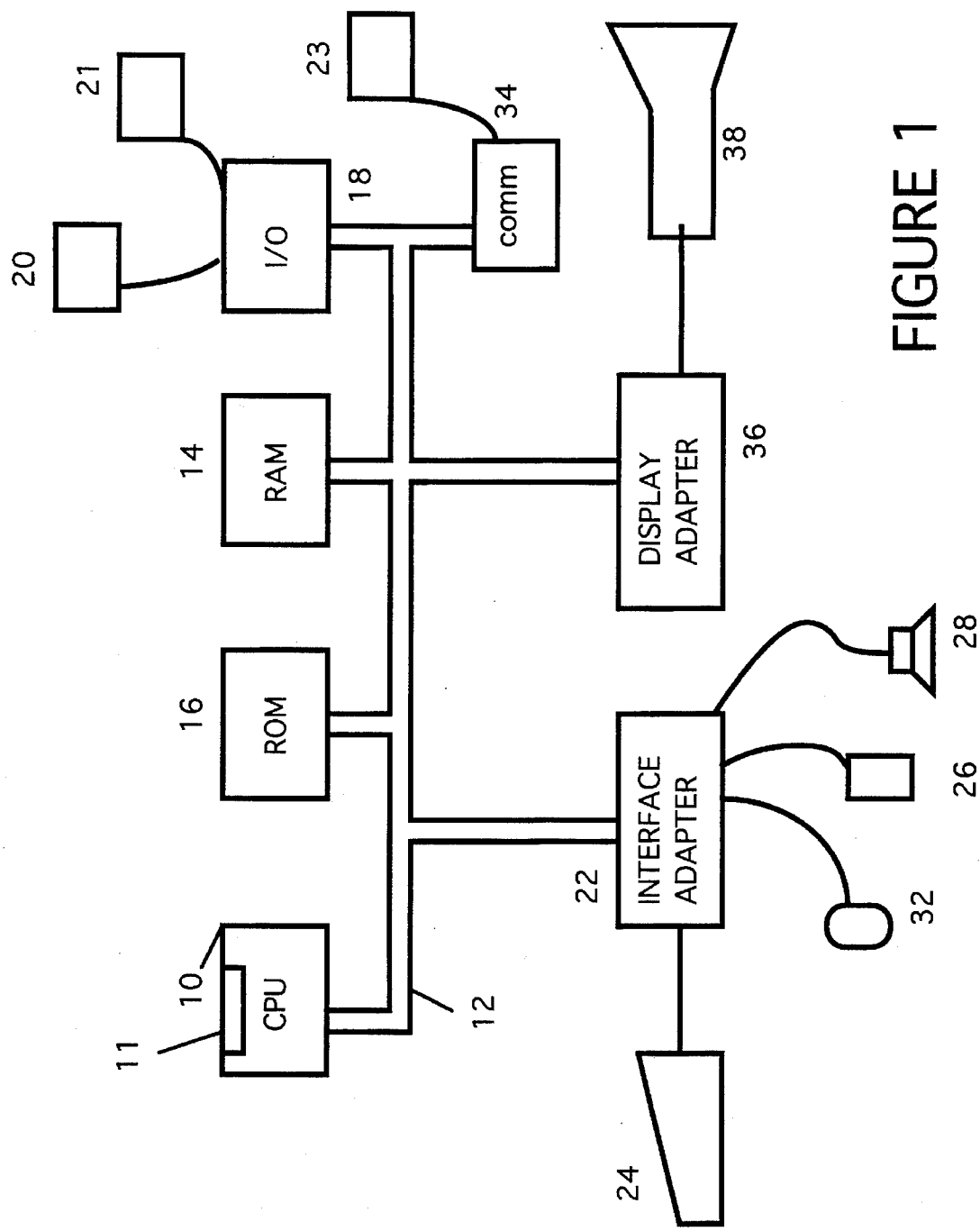
FIG. 1 is a block diagram of a personal computer system in accordance with a preferred embodiment.
Figure 2:
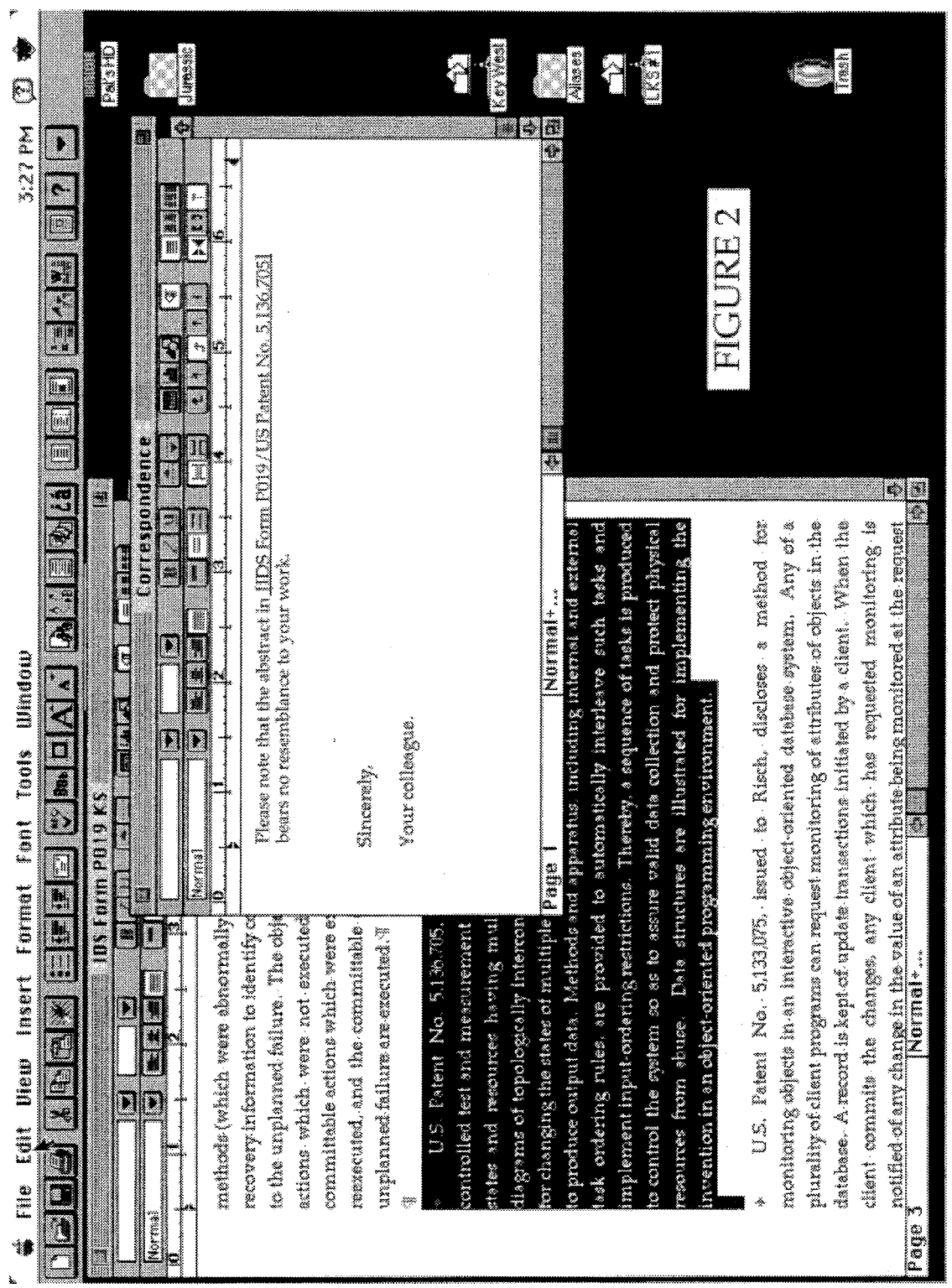
FIG. 2 is an illustration of a document display with a selected area and a reference object in accordance with a preferred embodiment.

A reference object has inherent characteristics that distinguish it from other objects on a graphic display. First, a reference can be placed anywhere that user data can be placed (e.g., in a document, container, place, or just on the desktop). Second, a reference refers to a real object, not another reference. A reference refers to one and only one selection which can contain a plurality of objects. A reference continues to refer to an object independent of changes to the number of references or the object's attributes (e.g., name, icon) and/or its position in the containment hierarchy. Opening a reference will open and present the referred-to object. Copying, or deleting a reference does not copy, or delete the referred-to object. Since a reference does not guarantee the existence of the referred-to object, a reference is unidirectional by default.

Inherited Characteristics of a Reference

Because a reference is a model anchor as described in the patent application entitled, DYNAMIC LINKING SYSTEM U.S. application No. 08/094/657 which is incorporated in its entirety in this patent application. A reference inherits the following characteristics:

A reference can follow its link to the referred-to object.

A reference can cache attributes, e.g., name, icon, etc.

A reference can be presented as an icon view.

Example Usage Scenarios

The first set of scenarios show how references are used in a system.

Technical Papers

An author makes a reference to a section of a paper by another author. The reference specifies exactly which page and paragraph is relevant to the topic. A reader can then use the reference to navigate from the first author's paper to the relevant information in the second author's paper.

Spreadsheets

Often, it is desirable to reference the value of one cell in a spreadsheet in the formula that calculates the value in another cell. A user can also use the reference to navigate to the cell whether it be in the same or a different spreadsheet.

Folders

A user can place a reference to a folder inside another folder so that the reference appears to be in a different folder hierarchy. Opening the reference folder, brings the user to the original folder location.

Appliances

If the user needs access to an appliance (printer, fax machine, telephone, etc.) from a different location on their system, they can create a reference to the appliance and place it in the desired location. The reference can then be used either as a navigational aid, or the appliance can be used directly through the reference without navigating to its actual location.

Business Cards

A reference to a person's printer can be placed on their electronic business card so that a recipient of the business card can use the reference to navigate to the first party's printer.

The following scenarios will use references of folders and documents to describe the user interaction with references. Other types of references will behave similarly.

Making a reference of a document inside a folder from the same folder: A user command-drags (press the Command key while dragging) Document A from Folder X and drops it into the same folder. It appears as Document A (a reference to Document A) in Folder X.

Making a reference of a text selection inside a document from another folder: A user command-drags a text selection inside Document B and drops it into Folder X. It appears as Document B (a reference to Document A) in Folder X.

Making a reference of a document inside a folder from another document: A user command-drags Document A inside Folder X and drops it into Document B. It appears as Document A (a reference to Document A) in Document B.

Deleting a reference: A user drags Document A from Document B into a Waste Basket (a reference to the Trash Can) or into the Trash Can itself.

Copying (moving) a reference from one folder to another folder: A user option-drags (drags) Document A from Folder X to Folder Y. It appears as Document A' in Folder Y.

Copying (moving) a reference from a folder to a document: A user option-drags (drags) Document A from Folder X to Document B. It appears as Document A' in Document B.

Copying (moving) a reference from a document to a folder: A user option-drags (drags) Document A' from Document B to Folder X. It appears as Document A" in Document B.

Detailed Class Architecture

Hyperlinks are bi-directional links from a source anchor to a destination anchor. Containables are potentially bi-directional links from an empty anchor to a destination anchor. References are potentially bi-directional links from a possibly empty anchor to a destination anchor. Each one has a unique protocol for presentation, caching of attributes, and following the links to the destination anchor. The design for dealing with the similarities exhibited by hyperlinks, containables, and references is as follows:

The support for hyperlinks, containables, and references is provided by TContainPolicy, whose default implementation is TStandardContainPolicy. These classes are part of the Container Framework, which also provides two abstract model classes for subclassing to create new data types. See the 37 Model classes" section below for details. On the selection side, the support is provided by MSelectionCanContainPolicy, whose default implementation is TSelectionCanContainPolicy. These classes are also part of the Container Framework which also provides two abstract selection classes for subclassing to create new selection types. See the "Selection classes" section below for details.

The list of hyperlinks, containables, and references is a single list of TModelAnchor pointers. Hyperlink is a TModelAnchor. Containables and references descend from a common class, TContainable which is a subclass of TModelAnchor. See the 37 Hyperlink/containable/reference classes" section below for details.

A user can create references by selecting an object or collection of objects and command-dragging and dropping the selection. This action sends a MakeReference command with the source model selection (i.e., the dragged object) as a parameter to the source model, and a Paste command with the target model selection (i.e., the whole target model) as a parameter to the target model. The source and target can be the same or a different model. See the 37 Command classes" section below for details. Any model and model selection (with a TContainPolicy implementation) supports the display and manipulation of references from another model and model selection (with a TContainPolicy implementation). For example, a folder can contain a reference to a specific piece of text in a compound document (a compound document selection); and a compound document can contain a reference to a specific document in a folder (a folder selection). Such interoperability is possible because a reference is always wrapped in a TContainableWrapperModel which any model and model selection (with a TContainPolicy implementation) knows how to absorb. See the 37 Wrapper model classes" section below for details.

MODEL CLASSES

The Container Framework provides a TEmbedderContainerModel which can be subclassed from to create new data types which can embed and contain. For example, TCompoundDocumentModel is a document which can support embedded models as well as hyperlinks, containables, and references. Likewise, the Container Framework provides a TContainerModel which can be subclassed to create new data types which can only contain. For example, TFolderModel is a folder which can support hyperlinks, containables, and references.

Selection Classes

The Container Framework provides a TEmbedderContainerModelSelection which can be subclassed to create new selection types which can embed and contain. For example, TCompoundDocumentModelSelection is a document selection which supports embedded models as well as hyperlinks, containables, and references.

Likewise, the Container Framework provides a TContainerModelSelection which can be subclassed to create new selection types which can only contain. For example, TFolderModelSelection is a folder selection which can support hyperlinks, containables, and references.

Hyperlink/containable reference classes

The following protocols are provided by TModelAnchor for managing hyperlinks, containables, and references:

Attribute management protocol, i.e., adding, deleting, listing, and looking up their attributes;

Data management protocol, i.e., adding, copying, and deleting their data;

Link management protocol, i.e., adding, deleting, following, listing, and looking up their links (there is only one link in the case of a containable or a reference); and view creation protocol, i.e., creating icon views of hyperlinks, containables, and references.

The view creation protocol is used by a compound document presentation to create a link map of hyperlinks; it can also be used by a folder presentation to create an outline view of containables and references.

TContainable is an abstract subclass of TModelAnchor. It redefines new protocols specific to containables (TOwnedContainable) and references (TReferencedContainable):

Attribute management protocol, i.e., accelerator methods for retrieving special attributes. These attributes may include system-defined attributes (size, author, creation date, type, various iconic representations and adornments for creating views of the containable or reference) and user-defined attributes (name, user-defined labels). If TContainable does not find the attributes in its local cache, it accesses the model store to retrieve the attributes. In some cases, it may find the attributes in the user interface archive; for example, if a model does not have a custom icon, it retrieves a generic 37 document" icon.

Data management protocol, i.e., redefined methods for copying and deleting.

|  | TOwnedContainable | TReferencedContainable |
|---|---|---|
| Copy | Copies containable and model | Copies reference only |
| Delete | Deletes containable and model | Deletes reference only |

Method to wrap the containable or reference in a model so that it can participate in data exchange (e.g., cut, copy, and paste) using model selection.

Method for the Preferences Framework to open a property-sheet on the containable.

Other subclasses of TContainable can be written if different semantics and/or behavior is required. For example, 37 opening" stationery causes a new document to be created. Thus TStationeryContainable, a subclass of TContainable, has to override its link-follow method to provide the right behavior.

Command classes

The MakeReference command is a new standard command which works on any model selection and its associated model.

MakeReference works as follows: Get the data from the source model selection. The data will be 1. of type TModelAnchor pointer and represents a hyperlink, a containable, or a reference.
2. Create a reference on the data.
3. Make this reference the new source model selection.
4. Copy the new source model selection to the clipboard.

The Paste command is an existing standard command which works on any model selection and its associated model. Paste works as follows:

1. Ask the clipboard for a list of types which the foreign model can be converted to.
2. Ask the target model selection to choose from this list the type it wants the foreign model to be converted to and the way it wants to accept the converted foreign model (embed or absorb).
3. Ask the clipboard for a copy of the converted foreign model.
4. Ask the target model selection to accept the converted foreign model.
5. Make this model the new target model selection.

Wrapper Model classes

Models are required to wrap containables and references for data exchange (e.g., cut, copy, and paste) using model selections: the exchange currency is a model. Since a wrapper model need neither TContainPolicy nor TEmbedPolicy implementation, it can be created as a concrete subclass of TModel abstract class.

Figure 3:
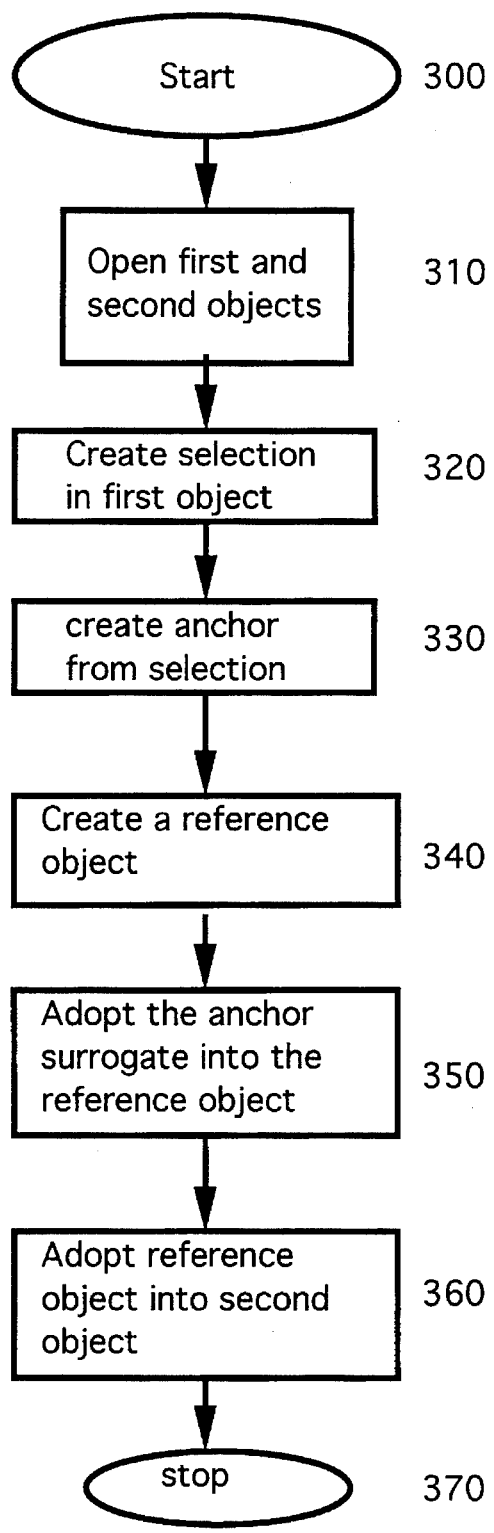
FIG. 3 is a flowchart presenting the processing that transpires in accordance with a preferred embodiment of the creation of a reference object.

FIG. 3 is a flowchart presenting the processing that transpires in accordance with a preferred embodiment of the creation of a reference object. Processing commences at terminal 300 and immediately passes to function block 310 where the first and second objects are opened. The objects could be text documents, graphic images, spreadsheets, folders or any other computer applications. Then, at function block 320, a selection is created in the first object by selecting a first corner of an area on the display and dragging an expanding, rectangular outline to enclose the selected area. At function block 330, an anchor is created from the selection by instantiating an anchor object. The anchor manages a selection area which is persistent as long as the selection area remains linked to the anchor object. Function block 340 illustrates the creation of a reference object. A reference object is a wrapper around an anchor object that allows the anchor object to reside inside any other object or container as discussed in the cross referenced patent applications. Then, at function block 350, the surrogate anchor is adopted into the reference object and the reference object is adopted into the second object as shown in function block 360. By surrogate anchor we mean a pointer to an actual anchor. Adoption refers to the processing necessary to transfer ownership from one object to another object. Finally, processing is completed at terminal 370. While this example has the reference object created in one document and adopted into a second document, one of ordinary skill in the art will recognize that the reference object could reside in a different location in the first document.

Figure 4:
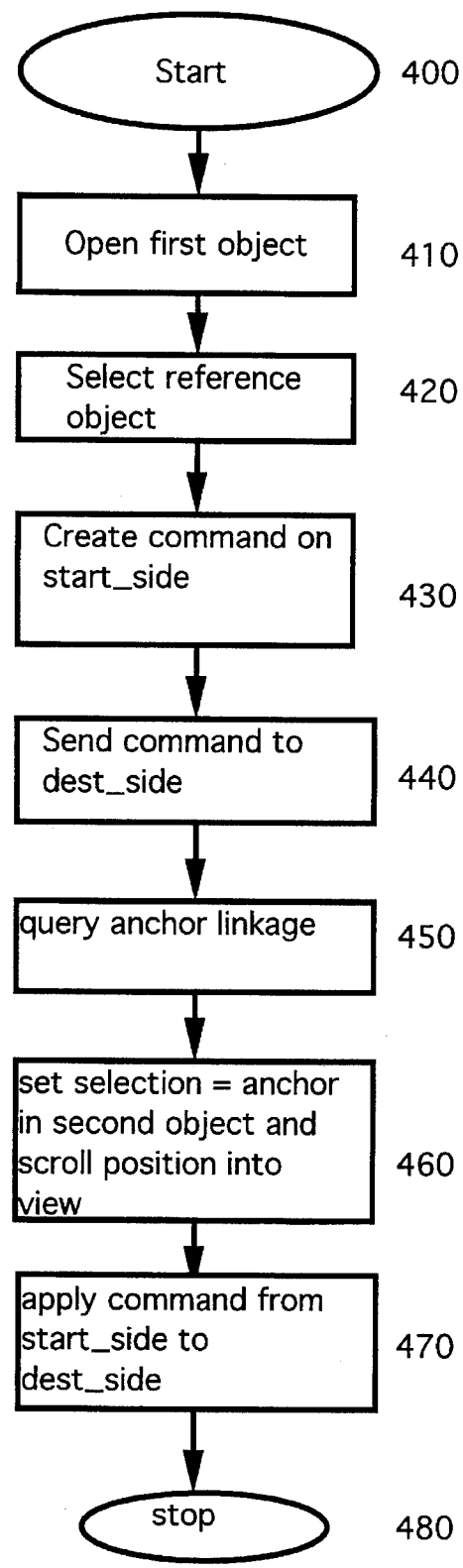
FIG. 4 is a flowchart setting forth the detailed logic in accordance with a preferred embodiment of the usage of a reference object.

FIG. 4 is a flowchart presenting the processing that transpires in accordance with a preferred embodiment of the usage of a reference object. Processing commences at terminal 400 and immediately passes to function block 410 where the first object is opened. The object could be a text document, graphic image, spreadsheet, folder or other computer application. Then, at function block 420, a reference object is selected. The reference object abstractly specifies a target for an action because it contains an anchor specifying the selection. The action is resolved at follow or lookup time. Function block 430 illustrates the creation processing for the command on the start_side. The creation processing responds to a user taking a specific action such as double-clicking to open an object. When an action is taken, an appropriate command is initiated to service the action. So, for example, the command could be a follow, or open command, a print command, a delete command, or any command relevant to the selection in the dest_side document. This processing creates the indicated command at the start_side of the document. Then, at function block 440, the command is sent to the dest_side of the other document's anchor. The send operation queries the linkage as shown in function block 450, opening the dest_side document, if necessary, setting the selection equal to the anchor on the dest_side, and scrolling the position of the anchor into view as set forth in function block 460. Then, the command applied at the start_side is applied at the dest_side as shown in function block 470. Finally, processing is completed at terminal 480. While this example has the reference object located in one document and the referenced anchor in a second document, one of ordinary skill in the art will recognize that the reference object and the referenced object could reside in the same document.

Figure 5:
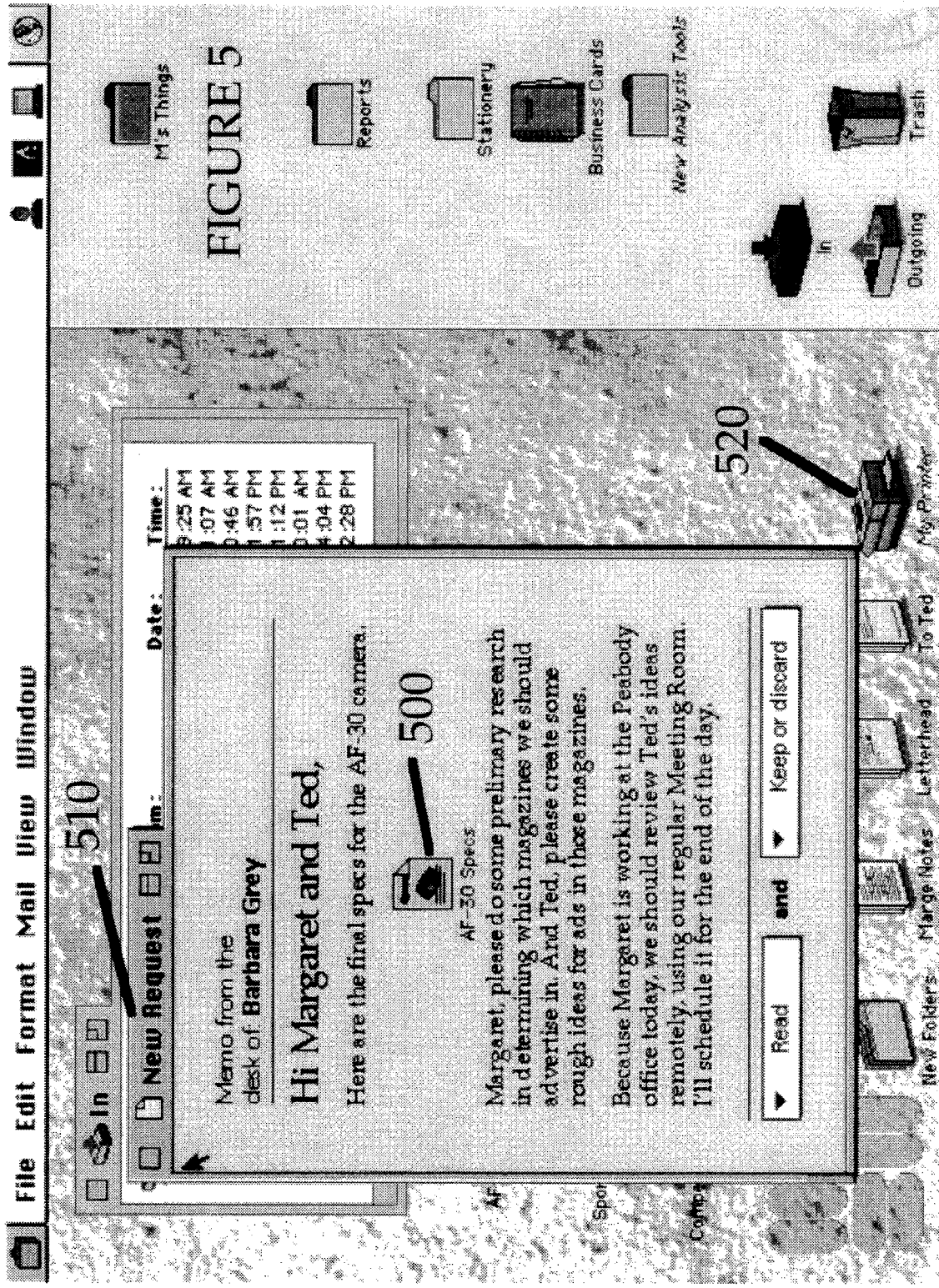
FIG. 5 illustrates a display with a reference to a remote printer in accordance With a preferred embodiment.

FIG. 5 illustrates a display with a reference to a remote printer in accordance with a preferred embodiment. A document icon 500 is currently resident in document New Request 510. A reference to a remote printer MyPrinter 520 is enabled in icon form. An example of a reference object being used to manipulate a remote resource is presented in FIGS. 5, 6 and 7 and their accompanying description.

Figure 6:
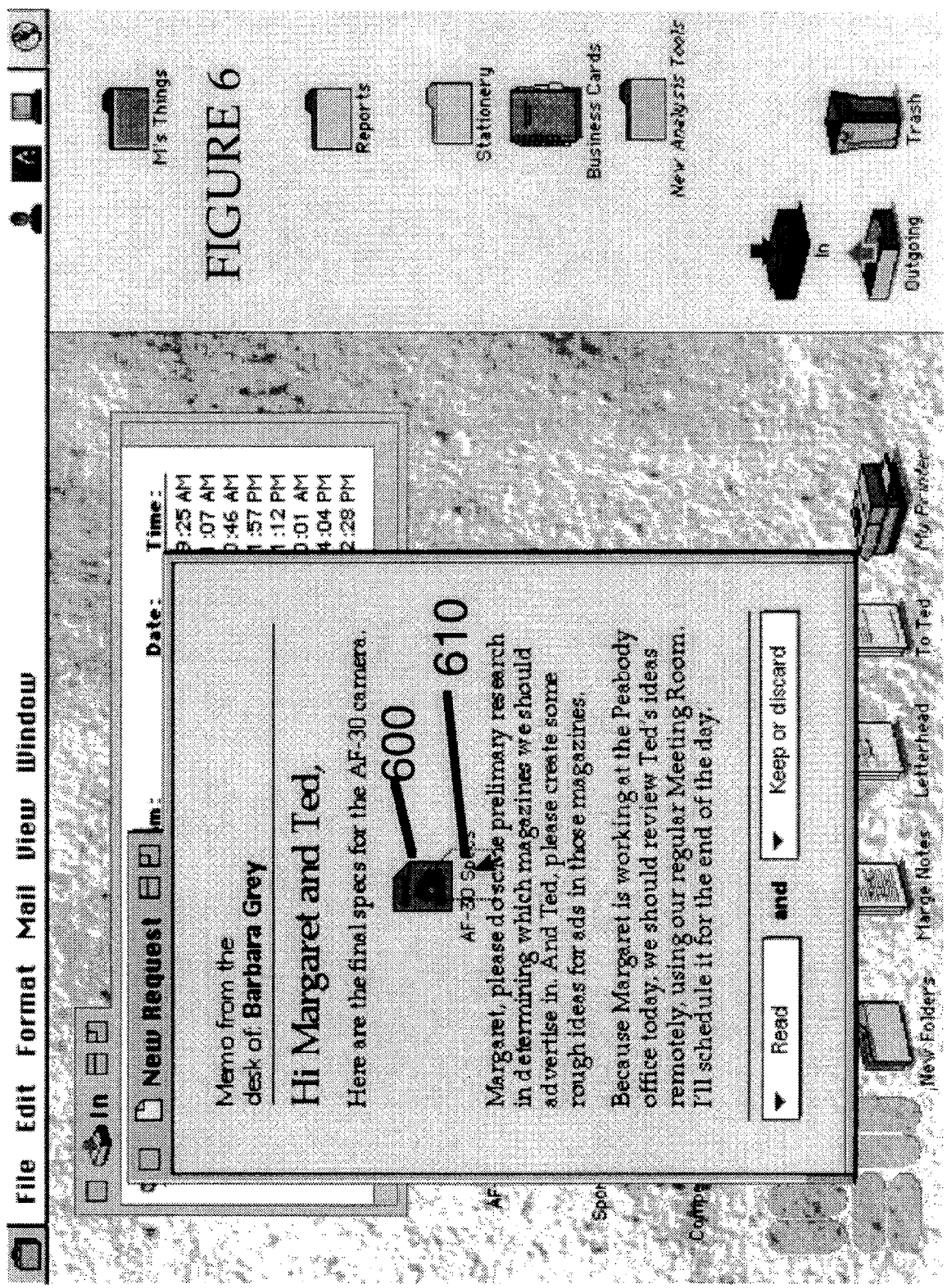
FIG. 6 illustrates a user dragging a copy of an object to a reference in accordance with a preferred embodiment.

FIG. 6 illustrates a user dragging a copy of an object to a reference in accordance with a preferred embodiment. FIG. 6 illustrates a document icon 600 and an outline 610 of the document. The outline is created by pressing the option key while dragging the icon 600. The outline represents a copy of the document.

FIG. 7 illustrates an object in proximity to a reference object in partial completion of an action in accordance with a preferred embodiment. The document outline 710 is dropped on the printer reference 720 to perform a print command on the document 700.

REFERENCE Program Listing
C++ Language

```
// Interface: TReferencedContainable
class TReferencedContainable: public TContainable
```

-continued

REFERENCE Program Listing
C++ Language

```
{
public:
    static const TContainableKind& kKind;
    // Special methods.
                                            TReferencedContain-
                                            able(const
    TAbstractModel&,
                                            const TAbstract-
                                               Model&);
                                            TReferencedContain-
                                            able( );
                                            TReferencedContain-
                                            able(const
    TReferencedContainable&);
                                            ~TReferenced-
                                            Containable( );
            TReferencedContainable&        operator=(const
                                            TReferencedContain-
                                            able&);
    virtual TStream&                       operator>>=
                                            (TStream& towhere)
                                            const;
    virtual TStream&                       operator<<=
                                            (TStream& towhere);
    MCollectibleDeclarationsMacro(TReferencedContainable);
    // Presentation methods.
    virtual TPresentableView*              CreateIconView( )
                                            const;
    // Semantic methods.
    virtual TContainableKind               GetContainableKind
                                            ( ) const;
    virtual void                           DeleteSelf( );
    virtual TContainable*                  DuplicateSelf( )
                                            const;
};
// Interface: TMakeReferenceUserCommand
class TMakeReferenceUserCommand: public
TNewAnchorCommand
{
public:
                                            TMakeReferenceUser-
                                            Command(const
                                            TText&);
                                            TMakeReferenceUser-
                                            Command( );
                                            TMakeReferenceUser-
                                            Command(const
    TMakeReferenceUserCommand&);
    virtual                                ~TMakeReference-
                                            UserCommand( );
        TMakeReferenceUserCommand& operator=(const
    TMakeReferenceUserCommand&);
    virtual TStream&                       operator>>=
                                            (TStream&) const;
    virtual TStream&                       operator<<=
                                            (TStream&);
    MCollectibleDeclarationsMacro(TMakeReferenceUser-
       Command);
public:
    virtual Boolean                        HandleLocalDo( );
protected:
    virtual Boolean                        Accepts(const
                                            TModelSelection&)
                                            const;
};
//
++++++++++++++++++++++++++++++++
++++++++++++++++++++++++++++++++
++++++++++++++++++++++++++++++++
++++++++++
// Class Name:   TReferencedContainable
// Description:  A referenced containable is an alias to a
                document.
//              -CreateIconView returns an icon view for a
                referenced containable presentation.
```

-continued

REFERENCE Program Listing
C++ Language

```
//              -DeleteSelf is overridden so that removing a
                referenced containable
//                  from a container only removes itself.
//              -DuplicateSelf is overriden so that copying a
                referenced containable
//                  in a container only copies itself.
//              -GetContainableKind returns TReferenced-
                Containable::kKind as the type.
++++++++++++++++++++++++++++++++
++++++++++++++++++++++++++++++++
++++++++++++++++++++++++++++++++
++++++++++
MCollectibleDefinitionsMacro(TReferencedContainable, 0);
const TContainableKind TReferencedContainable_kKind
("TReferencedContainable");
const TContainableKind& TReferencedContainable::kKind =
TReferencedContainable_kKind;
TReferencedContainable::TReferencedContainable(const
TAbstractModel& containerModel,
        const TAbstractModel& containableModel)
        :TContainable(containerModel, containableModel)
{
}
TReferencedContainable::TReferencedContainable(   )
        :TContainable(   )
{
}
TReferencedContainable::TReferencedContainable(const
TReferencedContainable& copy)
        :TContainable(copy)
{
}
TReferencedContainable::~TReferencedContainable(   )
{
}
TReferencedContainable& TReferencedContainable::operator=
(const TReferencedContainable& copy)
{
    if (this != ©)
    {
        TRY
            TContainable::operator=(copy);
        CATCH(TStandardException)
            RETHROW *this;
        ENDTRY
    }
    return (*this);
}
TStream&
TReferencedContainable::operator>>=(TStream& towhere)
const
{
    TRY
        MAbstractModelAnchor::WriteVersion(towhere);
        TContainable::operator>>=(towhere);
    CATCH(TStandardException)
        RETHROW towhere;
    ENDTRY
    return towhere;
}
TStream&
TReferencedContainable::operator<<=(TStream& fromwhere)
{
    TRY
        VersionInfo theVersion = MAbstractModel-
            Anchor::ReadVersion(fromwhere);
        TContainable::operator<<=(fromwhere);
    CATCH(TStandardException)
        RETHROW fromwhere;
    ENDTRY
    return fromwhere;
}
TPresentableView*
TReferencedContainable::CreateIconView(   ) const
{
    // create the icon view for the referenced containable.
    TPresentableView* theView = new TContainableIcon-
        View((TContainable*)this,
        /*isReference=*/ TRUE);
        return (theView);
}
TContainableKind
TReferencedContainable::GetContainableKind(   ) const
{
    return (TReferencedContainable::kKind);
}
void
TReferencedContainable::DeleteSelf(   )
{
}
TContainable*
TReferencedContainable::DuplicateSelf(   ) const
{
    return ((TContainable*)this);
}
++++++++++++++++++++++++++++++++
++++++++++++++++++++++++++++++++
++++++++++++++++++++++++++++++++
++++++++++
// Class Name:      TMakeReferenceUserCommand
// Description:     TMakeReferenceUserCommand is activated by
                    a user selecting a menu item.
//                  It constructs a reference to the document
                    represented by a containable
//                  and adds the reference to the container model.
                    Currently,
//                  this command is a subclass of TNewAnchor-
                    Command
                    and depends on the
//                  current implementation of a containable
                    (referenced or owned) being
//                  a model anchor. It reuses HandleReDo,
                    HandleUndo, HandleNewAnchor
//                  of TNewAnchorCommand to add the reference
                    to the container model.
++++++++++++++++++++++++++++++++
++++++++++++++++++++++++++++++++
++++++++++++++++++++++++++++++++
++++++++++
MCollectibleDefinitionsMacro(TMakeReferenceUser-
Command, 0);
const TStandardText kMakeReferenceMenuName("Make
Reference");
TMakeReferenceUserCommand::TMakeReferenceUserCommand-
(const TText&
theCommandName)
        :TNewAnchorCommand(   )
{
    SetName(theCommandName);
}
TMakeReferenceUserCommand::TMakeReferenceUser-
Command(   )
        :TNewAnchorCommand(   )
{
    SetName(kMakeReferenceMenuName);
}
TMakeReferenceUserCommand::TMakeReferenceUserCommand-
(const
TMakeReferenceUserCommand& theCommand)
        :TNewAnchorCommand(theCommand)
{
    SetName(kMakeReferenceMenuName);
}
TMakeReferenceUserCommand::~TMakeReferenceUser-
Command(   )
{
}
TMakeReferenceUserCommand&
TMakeReferenceUserCommand::operator=(const TMake-
ReferenceUserCommand&
theCommand)
{
```

-continued

REFERENCE Program Listing
C++ Language

```
    if (this != &theCommand)
    {
        TRY
            TNewAnchorCommand::operator=(theCommand);
        CATCH(TStandardException)
            RETHROW *this;
        ENDTRY
    }
    return *this;
}
TStream&
TMakeReferenceUserCommand::operator>>=(TStream&
towhere) const
{
    TRY
        WriteVersion(towhere);
        TNewAnchorCommand::operator>>=(towhere);
    CATCH(TStandardException)
        RETHROW towhere;
    ENDTRY
    return towhere;
}
TStream&
TMakeReferenceUserCommand::operator<<=(TStream&
fromwhere)
{
    TRY
        VersionInfo theVersion = ReadVersion(fromwhere);
        TNewAnchorCommand::operator<<=(fromwhere);
    CATCH(TStandardException)
        RETHROW fromwhere;
    ENDTRY
    return fromwhere;
}
Boolean
TMakeReferenceUserCommand::Accepts(const TModelSelection&
theSelection) const
{
    Boolean accept = TModelCommand::Accepts(theSelection);
    if (accept)
    {
        accept = !theSelection.IsEmpty( ); // command is
        enabled if selection is non-
empty
    }
    return (accept);
}
Boolean
TMakeReferenceUserCommand::HandleLocalDo( )
{
    const TWorkspaceContainerSelection* theSelection = (const
TWorkspaceContainerSelection*)GetBoundSelection( );
    TContainableSurrogateIterator anIterator(theSelection);
    TModelAnchorSurrogate* theSurrogate = anIterator.First
    ( );
    if (theSurrogate != NIL)
    {
        TDocumentEntry entry;
        TModel* theModel = theSelection->GetModel( );
        TContainable* theContainable = (TContainable*)the-
        Model-
>LookupAnchor(*theSurrogate);
        const TModelLink* theLink = theContainable->
        GetLink( );
        TModelSurrogate* containerSurrogate = theLink->
        GetHere( )-
>CopyModelSurrogate( );
        TModelSurrogate* containableSurrogate = theLink->
        GetThere( )-
>CopyModelSurrogate( );
        // construct a reference whose containerSurrogate and
        containableSurrogate
        // equals those of the containable it refers to.
        TContainable* aReference = new TReferenced-
        Containable(*containerSurrogate,
*containableSurrogate);
```

-continued

REFERENCE Program Listing
C++ Language

```
        // construct a default selection with the reference as
        a member.
        TModelSelection* referenceSelection = theModel->
        CreateDefaultSelection( );
        referenceSelection->AddAnchor(*aReference);
        // have the reference adopt the selection.
        aReference->AdoptSelection(referenceSelection);
        // if the referenced containable is a stationery, then
        make the reference a
stationery
        if (theContainable->IsStationery( ))
            aReference->ToggleStationery( );
        // have the container model adopt the reference.
        AdoptAnchor(aReference);
    }
    return (TRUE);
}
```

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A method for navigating between a first and a second document object in a computer system having a processor, a storage attached to and under the control of the processor, a display attached to and under the control of the processor, the first and second document objects each consisting of a container object having therein a plurality of model objects each with a model object interface the method comprising the steps of:

(a) loading the first document object into the storage and presenting the first document object on the display;

(b) creating a first selection object associated with the first document object in the storage, the first selection object identifying a selected portion of one of the plurality of model objects;

(c) creating a reference object having a model object interface;

(d) inserting a reference to the first selection object into the reference object;

(e) loading a second document object into the storage and presenting the second document object on the display;

(f) placing the reference object associated with the first selection object in the second document object as a model object; and (g) navigating via the reference object in the second document object to the selected portion of the one of the plurality of model objects in the first document object.

2. A method as recited in claim 1, including the step of presenting current updates in the first document object on the display by navigating via the reference object in the second document object to the selected portion of the one of the plurality of model objects in the first document object and displaying the selected portion of the one of the plurality of model objects in a second document presentation.

3. A method as recited in claim 1, including the step of accessing information across a network by navigating via the reference object in the second document object to the selected portion of the one of the plurality of model objects in the first document object.

4. A method as recited in claim 1, including the step of performing commands on a remote object as if the object were on a local system.

5. A method as recited in claim 1, including the step of displaying relevant portions of a first document object by navigating via the reference in the second document to the relevant portions in the first document.

6. A method as recited in claim 1, wherein the first and second document objects are spreadsheets.

7. A method as recited in claim 6, including the step of applying a formula to information in a first spreadsheet on the display by navigating via the reference object in the second spreadsheet to the selected portion in the first spreadsheet and applying the formula to the information in the first spreadsheet.

8. A method as recited in claim 1, including the step of placing a reference object to a second folder inside of a first folder to enable navigation from the first to the second folder when the first folder is opened.

9. A method as recited in claim 1, including the steps of:
   (a) creating a third reference object to a computer resource;
   (b) storing the third reference object in storage;
   (c) displaying the third reference object on the display; and
   (d) performing iconic actions on an icon representing another object to place the icon in proximity to the third reference object in response to a cursor signal.

10. A method as recited in claim 9, including the step of dragging a document to the reference object and dropping the document on the reference object to invoke the iconic action.

11. A method as recited in claim 9, including the step of deleting a document as the iconic action.

12. A method as recited in claim 9, including the step of copying a document as the iconic action.

13. A method as recited in claim 9, including the step of printing a document as the iconic action.

14. A method as recited in claim 9, including the step of faxing a document as the iconic action.

15. A method as recited in claim 9, including the step of initiating a telephone call as the iconic action.

16. A method as recited in claim 9, including the step of storing a document as the iconic action.

17. A method as recited in claim 1 wherein step (b) includes the steps of:
   (b1) making a selection of a portion of one of the plurality of model objects;
   (b2) creating an anchor object; and
   (b3) linking the anchor object to the selected portion of the one of the plurality of model objects.

18. A method as recited in claim 17 wherein step (d) includes the step of:
   (d1) creating a surrogate anchor object which contains a pointer to the anchor object; and
   (d2) adopting the surrogate anchor object into the reference object.

19. A method as recited in claim 1 wherein step (g) includes the steps of:
   (g1) selecting the reference object in the second document object to perform an action on the reference object;
   (g2) creating a command to perform the action;
   (g3) sending the command to the anchor object in the first document object; and
   (g4) applying the command to the selected portion of one of the plurality of model objects.

20. A method as recited in claim 19 wherein step (g4) includes the step of:
   (g4A) scrolling the anchor object in the first document object into view on the display.

21. An apparatus for navigating between a first and second document object in a computer system having a processor, a storage attached to and under the control of the processor, a display attached to and under the control of the processor, the first and second document objects each consisting of a container object having therein a plurality of model objects each with a model object interface, comprising:
   (a) means for loading a first document object into the storage and presenting the first document object on the display;
   (b) means for creating a first selection object associated with the first selection object in the storage, the first selection object identifying a selected portion of one of the plurality of model objects;
   (c) means for creating a reference object having a model object interface;
   (d) means for inserting a reference to the first selection object into the reference object;
   (e) means for loading a second document object into the storage and presenting the second document object on the display;
   (f) means for placing the reference object associated with the first selection object in the second document object as a model object; and
   (g) means for navigating via the reference object in the second document object to the selected portion of the one of the plurality of model objects in the first document object.

22. An apparatus as recited in claim 21, including means for presenting current updates in the first document object on the display by invoking the means for navigating to reference the selected portion of the one of the plurality of model objects in the first document object and displaying the selected portion of the one of the plurality of model objects in a second document presentation.

23. An apparatus as recited in claim 21, including means for accessing information across a network by invoking the means for navigating to reference the selected portion of the one of the plurality of model objects in the first document object.

24. An apparatus as recited in claim 21, including means for performing commands on a remote object as if the object were on a local system.

25. An apparatus as recited, in claim 21, including means for displaying relevant portions of a first document by invoking the means for navigating to reference the relevant portions in the first document object.

26. An apparatus as recited in claim 21, wherein the first and second documents are spreadsheets.

27. An apparatus as recited in claim 26, including means for applying a formula to information in a first spreadsheet on the display by invoking means for navigating to reference the first selection in the first spreadsheet and applying the formula to the information in the first spreadsheet.

28. An apparatus as recited in claim 21, including means for placing a reference to a second folder inside of a first folder to enable navigation from the first to the second folder when the first folder is opened.

29. An apparatus as recited in claim 21, further comprising:

(a) means for creating a third reference object to a computer resource;
(b) means for storing the third reference object in storage;
(c) means for displaying the third reference object on the display; and
(d) means for performing iconic actions on an icon representing another object to place the icon in proximity to the third reference object in response to a cursor signal.

30. An apparatus as recited in claim 29, including means for dragging a document to the reference and dropping the document on the reference to invoke the iconic action.

31. An apparatus as recited in claim 29, including means for deleting a document as the iconic action.

32. An apparatus as recited in claim 29, including means for copying a document as the iconic action.

33. An apparatus as recited in claim 29, including means for printing a document as the iconic action.

34. An apparatus as recited in claim 29, including means for faxing a document as the iconic action.

35. An apparatus as recited in claim 29, including means for initiating a telephone call as the iconic action.

36. An apparatus as recited in claim 29, including means for storing a document as the iconic action.

37. An apparatus as recited in claim 21 wherein the first selection object creating means includes means for making a selection of a portion of one of the plurality of model objects, means for creating an anchor object and means for linking the anchor object to the selected portion of the one of the plurality of model objects.

38. An apparatus as recited in claim 37 wherein the inserting means includes means for creating a surrogate anchor object which contains a pointer to the anchor object and means for adopting the surrogate anchor object into the reference object.

39. An apparatus as recited in claim 21 wherein the navigating means includes means for selecting the reference object in the second document object to perform an action on the reference object, means for creating a command to perform the action, means for sending the command to the anchor object in the first document object and means for applying the command to the selected portion of one of the plurality of model objects.

40. An apparatus as recited in claim 39 wherein the command applying means includes means for scrolling the anchor object in the first document object into view on the display.

* * * * *